March 28, 1961
A. BIANCHI
2,976,766
SPECTACLE FRAME HAVING TEMPLES CAPABLE
OF ELASTIC DIVARICATION
Filed Oct. 7, 1957
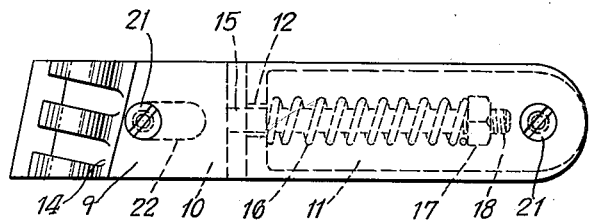
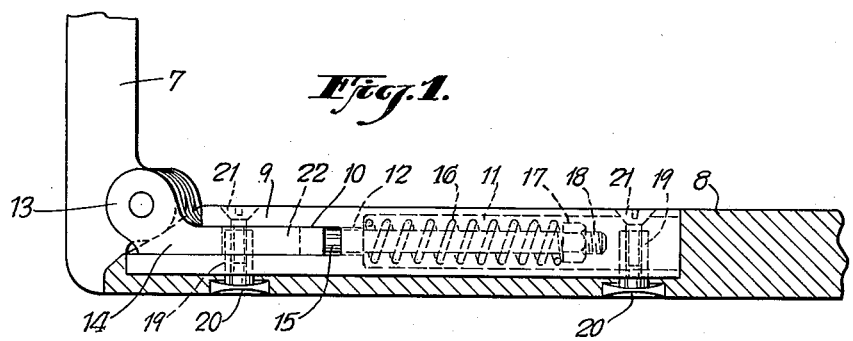
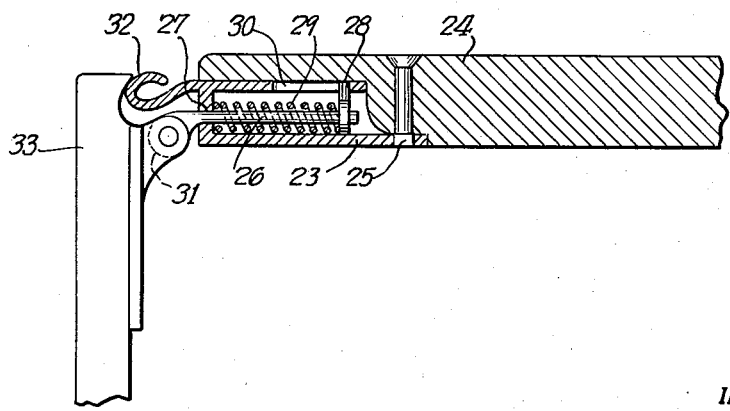
INVENTOR.
ANTONIO BIANCHI.
BY
K. B. Mayr
ATTORNEY.

United States Patent Office 2,976,766
Patented Mar. 28, 1961

2,976,766

SPECTACLE FRAME HAVING TEMPLES CAPABLE OF ELASTIC DIVARICATION

Antonio Bianchi, Milan, Italy, assignor to F.I.O.C. Fabbrica Italiana Occhiali Cibiana-Bianchi, Genova & C.

Filed Oct. 7, 1957, Ser. No. 688,741

Claims priority, application Italy Oct. 8, 1956

2 Claims. (Cl. 88—41)

The present invention relates to an improved spectacle frame.

In the conventional frames for spectacles in which the temples are hinged to the side ends of the front frame, so as to allow inside folding of one temple upon the other temple, opening of the temples is limited by the abutment of the temples against the front frame.

The problem of making it easy and comfortable to put on the eye glasses and of obtaining a perfect fit of the temples on the user's head, without requiring special adjustment each time, has always been and still is a topical subject in the field of optics, which has not found a convenient solution.

The object of the present invention resides in the provision of frames for spectacles which frames successfully solve the aforesaid problem.

The novel features which are considered characteristic of the invention are set forth with particularity in the appended claims. The invention itself, however, and additional objects and advantages thereof will best be understood from the following description of embodiments thereof when read in connection with the accompanying drawing, in which:

Fig. 1 is a horizontal part sectional view of a portion of a spectacle frame according to the invention.

Fig. 2 is an inside elevation of a portion of the frame shown in Fig. 1.

Fig. 3 is a horizontal part sectional view of a portion of a modified spectacle frame according to the invention.

Referring more particularly to Figs. 1 and 2 of the drawing, numeral 7 designates the frontal frame portion of a spectacle frame, and numeral 8 designates a temple. The forward end of the temple 8 is provided on its inside face with a recess in which a hollow member 9 is placed, the member having a slot 10 longitudinally of the temple and a chamber 11 communicating with said slot through a bore 12. The temple 8 is hinged to the front part 7 of the frame by means of a hinge 13 including a flat extension or strap 14 slidingly fitting in the slot 10. The strap 14 has a pinlike end portion 15 extending through the bore 12 into the chamber 11. A coil spring 16 surrounds the portion 15. One end of the spring 16 abuts against the wall of chamber 11 in which wall is the hole 12. The other end of the spring 16 abuts against a nut 17 screwed on the threaded end 18 of the portion 15. The member 9 is connected with the temple 8 by two pins 19 individually having heads 20 imbedded in the temple. The free ends of the pins 19 are secured by screws 21 to the member 9. The forward pin 19 extends through a slot 22 in the strap 14 for limiting the longitudinal movability of the temple 8 relatively to the hinge 13. The operation of the mechanism is obvious; the divarication of the temples which is limited by the abutment of the forward end of the temples against the frontal frame portion can be enlarged by overcoming the resistance of the springs 16 which return the temples to a neutral position when the frame is left alone.

In the modification shown in Fig. 3 a hollow member 23 is fitted to the forward end of a temple 24 and held thereto by a rivet 25. A strap 26 extends from a hinge 31 through a bore 27 into the interior of the member 23. A coil spring 29 surrounds the strap 26, the forward end of the spring abutting against the forward inside wall of the member 23 and the rear end of the spring 29 abutting against a transverse plate or pin 28 which is made fast on the free end of the strap 26, and has an end extending into and being guided by a longitudinal slot 30 in the member 23. The latter has a forward hook-shaped protuberance or extension 32 engaging a corresponding surface portion of a frontal frame portion 33 which is jointed with the member 23 by the hinge 31. The spring 29 holds the temple 24 in an innermost position from which it can be bent outwards against the action of the spring 29.

What I claim is:

1. A spectacle frame comprising, in combination, a frontal member having two lateral end portions, each end portion having a free outer end, two temples, each temple having a forward end portion, an oblong cavity in said forward end portion extending longitudinally of the temple, an oblong hollow element fitted in said cavity and rigidly connected to the temple, an oblong member longitudinally movably inserted in the hollow of each of said hollow elements and having an end protruding therefrom, parts individually connected to the end portions of said frontal member inside of the free ends of said end portions and individually pivotally connected to the ends of said oblong members protruding from said hollow elements, each of said hollow elements having an extension projecting beyond the forward end of the temple into the cavity of which the hollow element is fitted, said extensions being adapted to individually abut against the free outer ends of said lateral end portions of said frontal member, and a spring placed entirely inside each of said hollow elements and having an end engaged by the respective hollow element and having a second end connected to the respective oblong member for urging the latter into said hollow element and said extension against said frontal member to yieldably hold the respective temple at the desired angle with respect to said frontal member.

2. A spectacle frame as defined in claim 1 wherein each of said oblong hollow elements has a slot extending longitudinally of the hollow element and facing the respective temple, a plate connected to each of said oblong members, said plates being individually placed in the hollows of said elements, each plate having a portion extending into said slot for preventing rotation and limiting the longitudinal movement of said oblong members, the connection of the second ends of said springs to said oblong members being effected by abutment of said second ends against said plates.

References Cited in the file of this patent

UNITED STATES PATENTS

| | | |
|---|---|---|
| 384,481 | Vanderwaag | June 12, 1888 |
| 1,625,050 | Page | Apr. 19, 1927 |
| 1,924,951 | Marciano | Aug. 29, 1933 |
| 2,026,723 | Wollensak | Jan. 7, 1936 |

FOREIGN PATENTS

| | | |
|---|---|---|
| 436,927 | Italy | June 16, 1948 |
| 454,716 | Italy | Feb. 1, 1950 |
| 56,590 | France | July 23, 1952 |
| | (1st addition to 933,077) | |
| 1,112,839 | France | Nov. 23, 1955 |
| 162,502 | Switzerland | Sept. 1, 1933 |
| 269,226 | Switzerland | Oct. 2, 1950 |